(12) United States Patent
Chmaytelli

(10) Patent No.: US 8,903,407 B2
(45) Date of Patent: Dec. 2, 2014

(54) SYSTEM AND METHOD FOR ADAPTABLE MULTIMEDIA DOWNLOAD RESULTING IN EFFICIENT AIRLINK USAGE

(75) Inventor: Mazen Chmaytelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1318 days.

(21) Appl. No.: 11/563,193

(22) Filed: Nov. 25, 2006

(65) Prior Publication Data

US 2008/0125133 A1    May 29, 2008

(51) Int. Cl.
| H04W 72/00 | (2009.01) |
| H04L 12/825 | (2013.01) |
| H04W 28/22 | (2009.01) |
| H04L 29/08 | (2006.01) |
| H04L 12/801 | (2013.01) |

(52) U.S. Cl.
CPC ............... *H04L 47/10* (2013.01); *H04L 47/25* (2013.01); *H04W 28/22* (2013.01); *H04L 67/32* (2013.01); *H04L 47/14* (2013.01)
USPC ........................................................ 455/450

(58) Field of Classification Search
CPC .... H04W 52/146; H04W 28/22; H04W 72/12
USPC ........................................................ 455/450
See application file for complete search history.

(56) References Cited

U.S. PATENT DOCUMENTS

| 2005/0132045 A1 | 6/2005 | Hornback et al. |
| 2007/0026803 A1* | 2/2007 | Malm ........................... 455/63.1 |
| 2007/0038470 A1* | 2/2007 | Nakamura et al. ................. 705/1 |
| 2007/0053446 A1* | 3/2007 | Spilo ............................. 375/259 |

FOREIGN PATENT DOCUMENTS

| CN | 1685671 A | 10/2005 |
| JP | 07264563 | 10/1995 |
| JP | 2001506066 A | 5/2001 |
| JP | 2003332973 | 11/2003 |
| JP | 2004282168 A | 10/2004 |
| JP | 2007536818 A | 12/2007 |
| WO | WO 9819481 | 5/1998 |
| WO | 0210943 | 2/2002 |
| WO | WO2004028095 A1 | 4/2004 |
| WO | 2005109825 | 11/2005 |

OTHER PUBLICATIONS

International Search Report, PCT/US07/085410, International Search Authority, European Patent Office, Jul. 9, 2008.
Written Opinion, PCT/US07/085410, International Search Authority, European Patent Office, Jul. 9, 2008.

* cited by examiner

*Primary Examiner* — Ankur Jain
(74) *Attorney, Agent, or Firm* — Shirin Tefagh (57) ABSTRACT

Apparatus and methods provide for a way to intelligently maximizing capability for a media download service over a wireless network. An available bandwidth of the wireless network is estimated and compared against a threshold. If the available bandwidth is above a predetermined threshold, the service is operated in a high bandwidth mode. If the bandwidth is not above a predetermined threshold, the service is operated in a low bandwidth mode.

27 Claims, 5 Drawing Sheets

SYSTEM AND METHOD FOR ADAPTABLE MULTIMEDIA DOWNLOAD RESULTING IN EFFICIENT AIRLINK USAGE

FIELD OF THE INVENTION

The present invention relates generally to wireless communication, and more particularly to taking advantage of network bandwidth for a media download service.

BACKGROUND OF THE INVENTION

Figure 1:
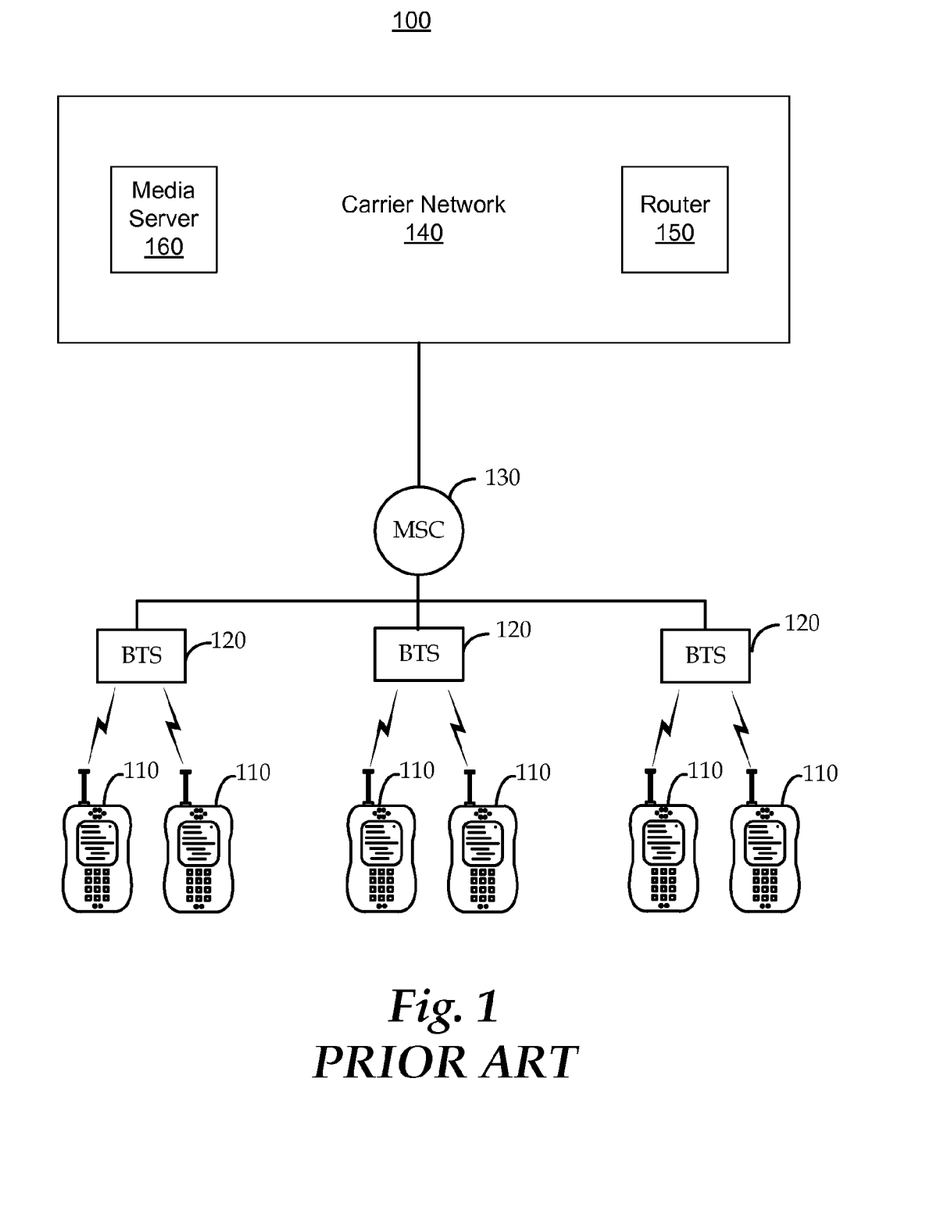
FIG. 1 is a illustration of conventional wireless communication system.

FIG. 1 is an illustration of a wireless communication system 100. The system 100 includes a plurality of wireless devices 110, such as cellular telephones, and a plurality of base stations (BTS) 120 which are arranged to provide coverage over a geographic area. Each wireless device 110 is typically in communication with a just one of the BTSs 120. However, there may be some situations where a wireless device 110 is in communication with multiple BTSs 120.

The system 100 also includes a mobile switching center (MSC) 130. The MSC is in communication with each of the BTSs 120, and with the carrier network 140 of the wireless carrier operating the BTSs 120 and the MSC 130. The carrier network 140 may include one or more routers 150, for coupling the carrier network 140 to other networks (not illustrated). Examples of the other networks may be other voice and data networks, including for example, another wireless carrier's network, a land line carrier's network, and/or a data network, such as the Internet. The system 100 may also include a media server 160, which will be described in greater detail below. The system 100 provides voice and data based services to the wireless devices 110. Accordingly, the wireless network 100 provides the capability for routing voice and data between the wireless devices 110.

Figure 2:
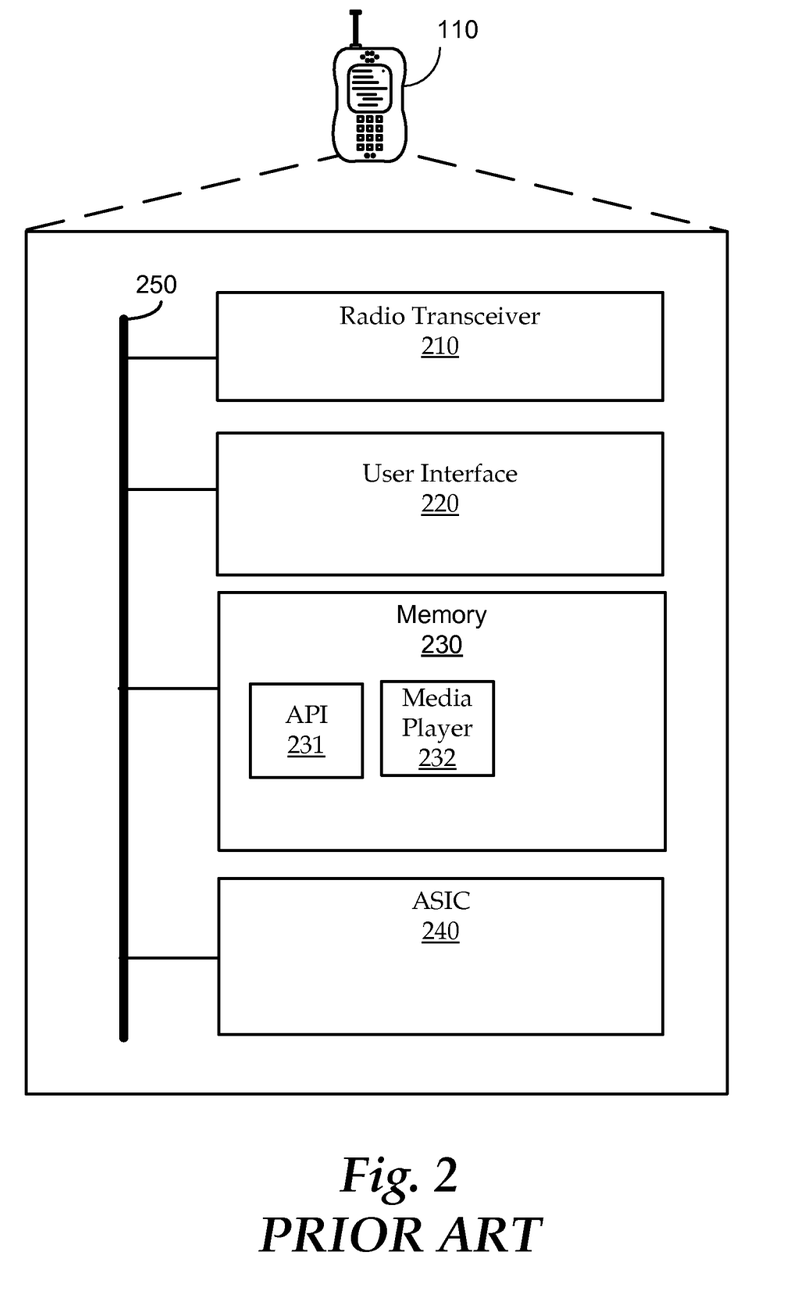
FIG. 2 is a illustration of a conventional wireless device.

FIG. 2 is a more detailed illustration of the wireless device 110. The wireless device 110 includes a radio transceiver 210 for wirelessly communicating with one or more BTSs 120 (FIG. 1) of the wireless communication system 100. The radio transceiver 210 is coupled to a bus 250. The wireless device 210 also includes a user interface 220, which is also coupled to the bus 250. Typically, the user interface 220 includes a display, a small keyboard, a microphone, and a speaker. The wireless device 110 also includes a memory 230, which is also coupled to the bus 250. The memory 230 may store code for supporting an application programming interface (API) 231. The contents of the memory 230 may also include one or more built-in applications, and memory space for receiving one or more downloadable applications. One common built-in application is a media player application 232. The media player application 232 is used to play different types of media, including musical tracks and videos.

The wireless device 110 also includes an application specific integrated circuit (ASIC) 240. The ASIC 240 is also coupled to the bus 250, and is used to operate and control the wireless device.

Now referring back to FIG. 1, the system 100 may also include a media server 160. The media server 160 would typically be used to support a media download service, where subscribers are billed for downloading target media from the media server 160 to other devices, such as the wireless devices 110. Since many wireless devices 100 are capable of playing audio files, one example of a media download service is a music download service, where each target media may be a musical track, for example, a song or an instrumental track. As illustrated, the media server 160 is shown as being part of the carrier network 140. However, it should be understood that the media server 160 may be located anywhere else as long as there is network connectivity between the wireless devices 110 and the media server 160. For example, the media server 160 may be located at over the Internet (not illustrated), and the network connectivity between the wireless devices 110 and the media server 160 may be provided via the router 150.

Each target media is generally encoded in accordance with an encoding scheme, to reduce the file size of the target media to a more manageable size, and perhaps to support a digital rights management scheme. Most encoding schemes permit the target media to be encoded using a range of encoding rates. Typically, the use of higher encoding rates permit higher fidelity reproduction, but comes at a cost of greater data storage space and longer download times. Similarly, the use of lower encoding rates reduces reproduction fidelity, but occupies less data storage space and permit faster downloads. Thus, for each target media, the media server 160 may store a plurality of encodings. For example, a low data rate encoding may be stored for streaming music, a middle data rate encoding may be stored for downloading to portable music players, and a high data rate encoding may be stored to permit a user to create a recordable compact disc. Further, the media server 160 may also store additional information related to the target media, such as album art, lyrics, music videos, etc.

Over the years there has been a number of improvement made to the wireless communication system 100. In particular, new air link interfaces have been introduced to the wireless communication system 100 to permit high speed data transmission. Additionally, new air link interfaces are being designed to further permit even higher speed data transmission wirelessly. Yet, despite these advances in air link throughput, media downloading services have not taken advantage of the new increased bandwidth. Accordingly, there is a need and desire for a way to intelligently maximizing capability for a media download service over a wireless network.

SUMMARY OF THE INVENTION

The disclosed embodiments provide apparatus and methods for intelligently maximizing capability for a media download service over a network. In one aspect, the invention includes a method for maximizing capability for a media download service over a network, comprising: estimating a bandwidth of said network; comparing said bandwidth against a predetermined threshold; if in said step of comparing said bandwidth is greater than said predetermined threshold, operating said media download in a high bandwidth mode. In another aspect, the invention includes a method for operating said media download in a low bandwidth mode if the available bandwidth is not greater than said predetermined threshold.

In yet another aspect, the invention is directed to a wireless device, comprising: a bus; a radio transceiver, coupled to said bus, for interfacing said wireless device with a wireless network; a user interface, coupled to said bus; a memory, coupled to said bus, said memory storing a media player and a high bandwidth air link maximizer for controlling a download of a target media for said media player; and an ASIC, coupled to said bus, said ASIC configured to control said radio transceiver, user interface, and memory; wherein said high bandwidth air link maximizer is configured to: estimate a bandwidth of said wireless network; compare said bandwidth against a predetermined threshold; causing said download to operate in a high bandwidth mode if said comparing determines that said bandwidth is greater than said predetermined threshold.

In another aspect, the invention is directed to a wireless device, comprising: a bus means; a radio transceiver means, coupled to said bus means, for interfacing said wireless device with a wireless network; a user interface means, coupled to said bus means; a memory means, coupled to said bus means, said memory means storing a media player and a high bandwidth air link maximizer means for controlling a download of a target media for said media player; and an ASIC means, coupled to said bus means, said ASIC means configured to control said radio transceiver means, user interface means, and memory means; wherein said high bandwidth air link maximizer means is configured to: estimate a bandwidth of said wireless network; compare said bandwidth against a predetermined threshold; if said comparing determines that said bandwidth is greater than said predetermined threshold, causing said download to operate in a high bandwidth mode.

In another aspect, the invention is directed to a computer readable medium storing instructions thereon, the instructions comprising: instructions for estimating a bandwidth of a wireless network; instructions for comparing said bandwidth against a predetermined threshold; instructions for operating a media download in a high bandwidth mode if in said step of comparing said bandwidth is determined to be greater than said predetermined threshold, operating a media download in a high bandwidth mode.

BRIEF DESCRIPTION OF THE DRAWINGS

The foregoing and other advantages and features of the invention will become more apparent from the detailed description of embodiments of the invention given below with reference to the accompanying drawings in which.

DETAILED DESCRIPTION

Figure 3:
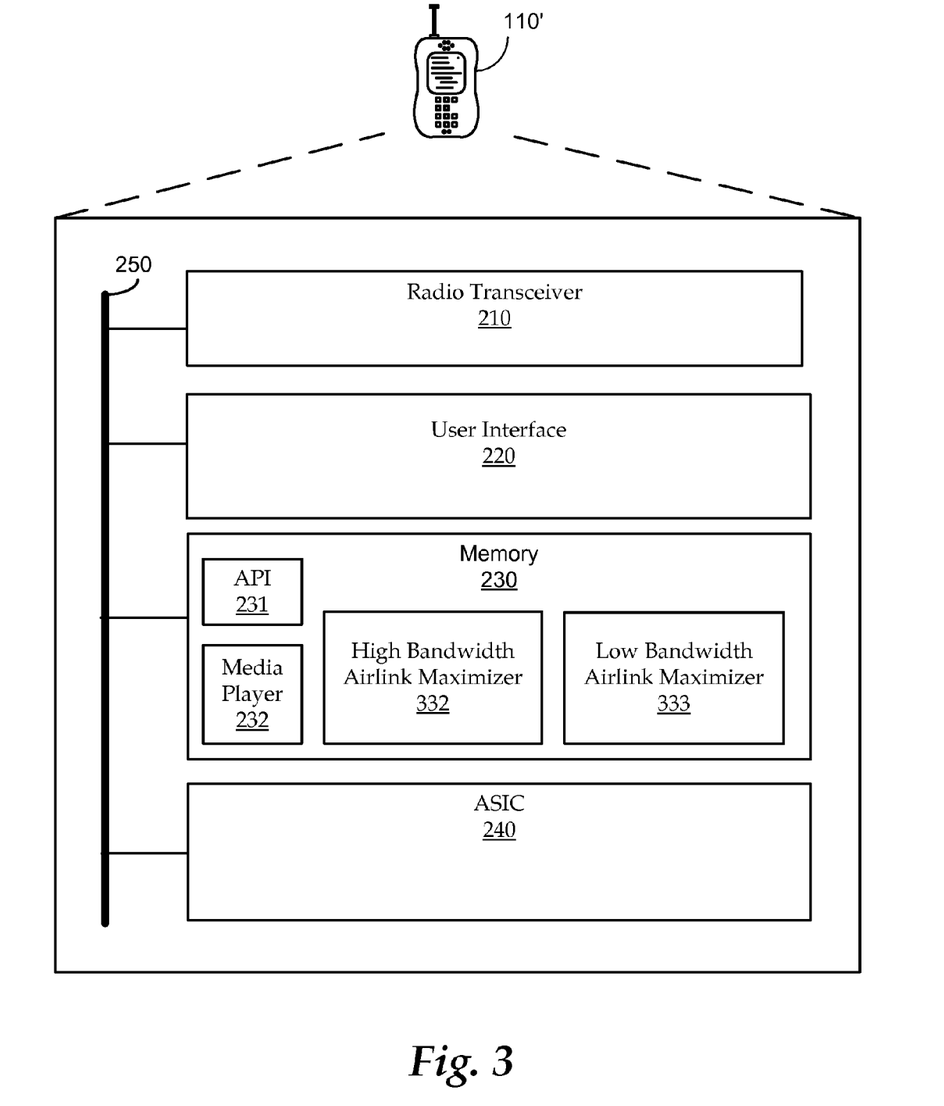
FIG. 3 is an illustration of a wireless device in accordance with one embodiment of the invention.

Now referring to the drawings, where like reference numerals designate like elements, there is shown in FIG. 3, a wireless device 110' in accordance with one embodiment of the present invention. The wireless device 110' can be substituted for the wireless device 110 (FIG. 1) in the wireless communication system 100.

The wireless device 110' includes a radio transceiver 210 for wirelessly communicating with one or more BTSs 120 (FIG. 1) of the wireless communication system 100. The radio transceiver 210 is coupled to a bus 250.

The wireless device 110' also includes a user interface 220, which is also coupled to the bus 250. Typically, the user interface 220 includes a display, a small keyboard, a microphone, and a speaker. However, one skilled in the art will recognize that the invention can be practiced using different user interfaces.

The wireless device 110' also includes a memory 230, which is coupled to the bus 250. The memory 230 may store code for supporting an application programming interface (API) 231. In one embodiment, the API is the API associated with QUALCOMM®, Inc.'s BREW® platform, however, one skilled in the art will recognize that the invention may be practiced in wireless devices which support other APIs.

The contents of the memory 230 may also include one or more built-in applications, and memory space for receiving one or more downloadable applications. In particular, the contents of the memory 230 includes a media player application 232. The media player application 232 is capable of playing different media types, and preferably designed to be compatible with downloadable compressors/decompressors (codecs) to permit the media player 232 to operate on new file types. In one embodiment, the contents of the memory 230 further include a High Bandwidth Airlink Maximizer 332 and a Low Bandwidth Airlink Maximizer 333. The High Bandwidth Airlink Maximizer 332 and the Low Bandwidth Airlink Maximizer 333 will be respectively explained in greater detail below in connection with FIGS. 4-5.

The wireless device 110' also includes an application specific integrated circuit (ASIC) 240, which controls the radio transceiver 210, user interface 220, and memory 230, via the bus 250.

One skilled in the art would understand that the architecture of the wireless device 110' can be varied without departing from the scope of the invention. For example, some potential variations include having multiple radio transceivers 210, have multiple memory unit 230, include, for example, different types of memory units such as a DRAM base memory unit and a non-volatile memory unit, for example, a FLASH, EPROM, EEPROM, or ROM memory unit. In some embodiments, at least part of the memory 230 may be embodied on the ASIC 240. Further, the ASIC 240 may be a plurality of ASICs or some combination of a non-ASIC chip and one or more ASICs.

Figure 4:
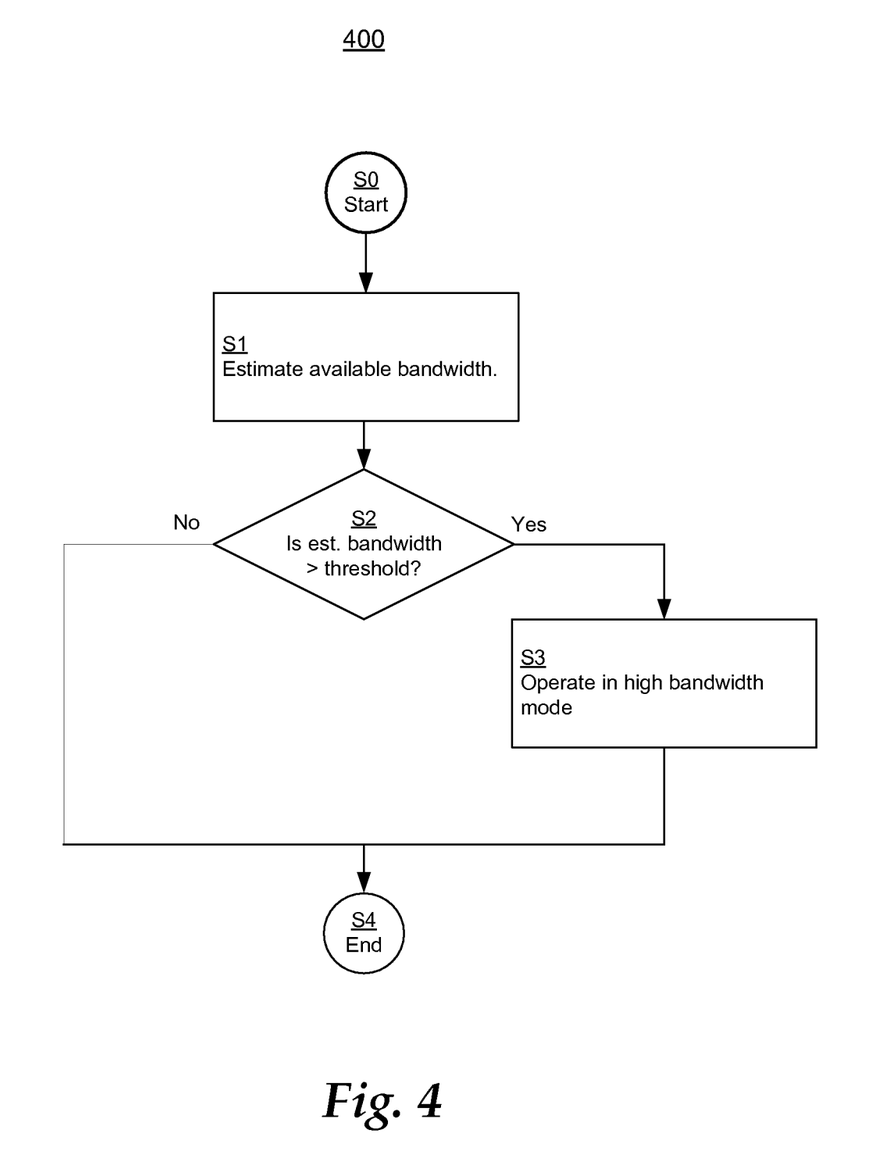
FIG. 4 is a flow chart illustrating a process for intelligently maximizing capability for a media download service over a network.

FIG. 4 is a flow chart illustrating a process 400 for intelligently maximizing capability for a media download service over a high bandwidth network by a wireless device 110' of the present invention. The process 400 starts at step S0 by proceeding to step S1.

At step S1, an estimate of available bandwidth is obtained. In a wireless device, the wireless network may support multiple air interfaces. For example, a wireless network may support a low speed interface primarily for voice communication (e.g., IS-95/TIA-EIA-95/cdmaOne or GMS) and one or more high speed interfaces, such as General Packet Radio Service (GPRS), IS-856/Evolution-Data Optimized (EV-DO), High Speed Downlink Packet Access (HSDPA), Universal Mobile Telecommunication Systems (UMTS). Each air interface is associated with a particular bandwidth, or a range of bandwidths. In one embodiment, an estimate of available bandwidth is made in accordance with which type of air interface is being utilized for communication between the wireless device 110' and the BTS 120 with which the wireless device 110' is communicating with.

Further, for some of the air interfaces, the available bandwidth may be further dependent upon an external factor. For instance, with the EV-DO air interface the available bandwidth may vary as a function of the distance between the wireless device 110' and the BST 120 in communication with the wireless device 110'. That distance may be calculated since the location of each BST 120 is known and the location of the wireless device 110' may be calculated using a number of techniques, including for example: use of signals received from global positioning satellites (GPS), or use of some combination of triangulation, angle of arrival, and/or time of arrival techniques on signals transmitted between the wireless device 110' and a BST 120. In one embodiment, an estimate of the available bandwidth is made in accordance with both the type of air interface as well as accounting for external factors known to affect bandwidth. Once the available bandwidth has been estimated, process 400 proceeds to step S2.

At step S2, the estimated available bandwidth is compared against a predetermined threshold level. The predetermined threshold level is a parameter which may be set by the wireless carrier or the media download service which operates the media server. If the estimated available bandwidth is greater than the predetermined threshold, the process 400 proceeds to step S3, while if the estimated available bandwidth is not greater than the predetermined threshold, the process 400 ends after proceeding to step S4.

At step S3, the media download service is operated in accordance with a high bandwidth mode. That is, the media download service is operated to take advantage of opportunity presented by having a high bandwidth connection. For example, in high bandwidth mode the wireless device 110' may perform opportunistic downloads, use higher encoding rates, swap for higher encoding rates, and/or pull supplemental materials. Each of these techniques are described in greater detail below. After step S3, the process 400 proceeds to end at step S4.

At step S4, the process 400 ends.

Opportunistic Downloads

Many music download services are capable of predicting what songs a consumer may like and wish to purchase or hear, based upon the listening or purchasing history of that consumer. An opportunistic download refers to a download process which also obtains preview portions of songs which the consumer is predicted to like. A preview portion of a song may be, for example, the first 30-seconds of a song. However, one skilled in the art would recognize that the invention may be practiced by selecting the preview portion from any portion of the song. In one embodiment, the wireless device 110' performs opportunistic downloads when the wireless device 110' is in the high bandwidth mode.

Using Higher Encoding Rates

As previously noted, the use of higher encoding rates permit higher fidelity reproduction, but comes at a cost of greater data storage space and longer download times. However, with ever increasing storage capacity available for wireless devices 110', and with the recent increases in wireless network bandwidth, wireless devices 110' are compatible with the use of higher encoding rates. In one embodiment, when a high bandwidth air interface is available, the wireless device 110' instructs the media server 160 to download a copy of the media encoded using a higher encoding rates in lieu of downloading a copy of the media having a lower encoding rate.

Swapping for Higher Encoding Rates

If certain media content had been originally obtained using a lower encoding rate, and the availability of high bandwidth would permit exchanging the existing media with media having identical subject matter, but a higher encoding rate. In one embodiment, when a high bandwidth air interface is available, the wireless device 110' replaces previously downloaded material encoded at a low encoding rate with corresponding content having a higher encoding rate.

Pulling Supplemental Materials

The media server 160 frequently stores other information associated with each media. Examples of other information may include art, videos, and lyrics associated with each song. In one embodiment, when a high bandwidth air interface is available, the wireless device 110' also downloads at least one of the art, video, and lyrics associated with media being downloaded.

Figure 5:
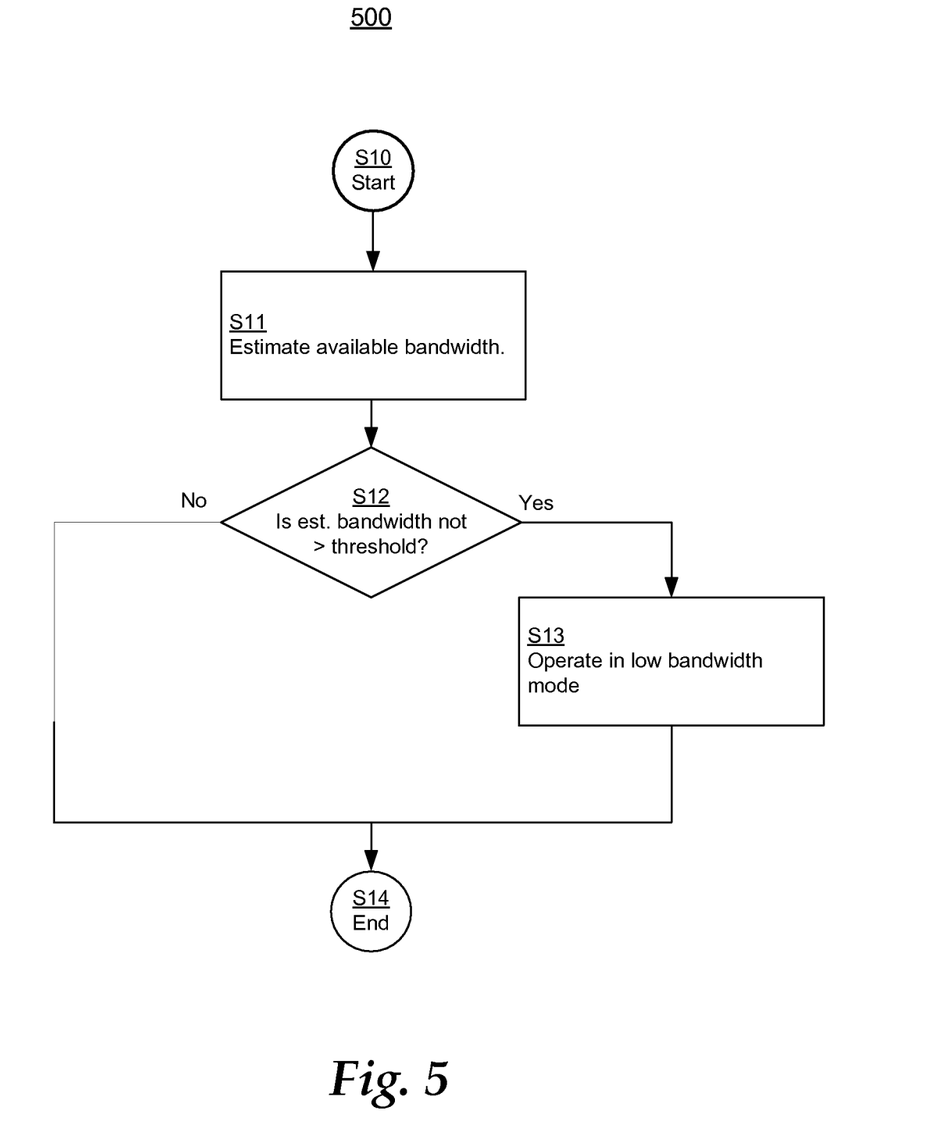
FIG. 5 is a flow chart illustrating another process for intelligently maximizing capability for a media download service over a network.

FIG. 5 is a flow chart illustrating a process 500 for intelligently maximizing capability for a media download service over a low bandwidth network by a wireless device 110' of the present invention. The process 500 starts at step S10 by proceeding to step S11.

At step S11, an estimate of available bandwidth is obtained. Step S11 is identical to step S1 (FIG. 4), which was previously described. Once the available bandwidth has been estimated, process 500 proceeds to step S2.

At step S12, the estimated available bandwidth is compared against the predetermined threshold level (described previously in connection with step S2 of FIG. 4). If the estimated available bandwidth is not greater than the predetermined threshold, the process 500 proceeds to step S13, while if the estimated available bandwidth is not greater than the predetermined threshold, the process 500 ends after proceeding to step S14.

At step S13, the media download service is operated in accordance with a low bandwidth mode. That is, the media download service is operated to be sensitive to the network link having relatively little network bandwidth. In one embodiment, the previously described opportunistic downloads, using higher encoding rates, swapping for higher encoding rates, and pulling supplemental features are disabled because these additional features were enabled only in the high bandwidth mode. In another embodiment, one or more of the previously described opportunistic downloads, swapping for higher encoding rates, and pulling supplemental features are enabled, but performed only during a predetermined time period, such as a wireless carrier's "off-peak" hours. After step S13, the process 500 proceeds to end at step S14.

At step S14, the process 500 ends.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention.

For example, while the application has discussed an application of the principle of the invention with respect to wireless networks and in particular air interfaces, one skilled in the art would recognize that the invention may also be practiced in a wired network environment. By means of an example, digital subscribe lines (DSL) lines have varying bandwidths which is partially a function of the length of the local loop between a subscriber and the subscriber's central office. Thus, the length of the local loop is somewhat analogous to the distance between the wireless device and its BST in an EV-DO environment, and the principles of the present invention could be applied to a wired DSL network.

Further, while the illustrated embodiment utilize a single parameter to determine whether to use the high or low bandwidth airlink maximizer, one skilled in the art would recognize that the principles of the present invention would be applicable to the use of more than two airlink maximizers. Such a system would also use more than one parameter for setting thresholds to determine which airlink maximizer to use.

Accordingly, the invention is not limited by the foregoing description or drawings, but is only limited by the scope of the appended claims.

What is claimed as new and desired to be protected by Letters Patent of the United States is:

1. A method for managing capability for a media download service over a network, comprising:
    estimating a bandwidth of said network;
    determining that the estimated bandwidth of said network is not greater than a threshold;
    downloading, based on the determination of the estimated bandwidth being not greater than the threshold, a target media a first time;
    later estimating, after the downloading of the target media the first time, the bandwidth of said network;
    determining that the later estimated bandwidth of said network is greater than the threshold; and
    downloading, based on the determination of the later estimated bandwidth being greater than the threshold, an enhanced version of the target media, wherein said downloading the enhanced version of the target media comprises:
        automatically selecting a higher encoding rate; and
        responsive to a previous act of downloading said target media at an encoding rate less than said higher encoding rate, downloading again said target media at said higher encoding rate only during a time period.

2. The method of claim 1, wherein said downloading the enhanced version of the target media comprises:
    downloading said target media; and
    automatically downloading a preview of media related to said target media.

3. The method of claim 1, wherein said downloading the enhanced version of the target media comprises:
    downloading said target media; and
    downloading additional content associated with said target media.

4. The method of claim 3, wherein said additional content comprises at least one of:
    album art associated with said target media;
    lyric text associated with said target media; or
    a music video associated with said target media.

5. The method of claim 1, wherein said network comprises a low speed interface and at least one high speed interface, each low and high speed interface respectively having different associated bandwidths, and said estimating comprises identifying which one of the low speed interface and the at least one high speed interface in use.

6. The method of claim 5, wherein said network is a wireless network and said high speed interface comprises at least one of:
    an IS-856/Evolution-Data Optimized (EV-DO) interface;
    a High Speed Downlink Packet Access (HSDPA) interface; or
    a Universal Mobile Telecommunication Systems (UMTS) interface.

7. The method of claim 1, wherein said bandwidth is a function of an external parameter, and said estimating comprises identifying a value of said external parameter.

8. The method of claim 7, wherein said network is using an IS-856/Evolution-Data Optimized (EV-DO) interface and said external parameter is a distance between a device for downloading and a base station in communication with said device for downloading.

9. The method of claim 1, wherein said downloading the target media the first time comprises:
    downloading said target media; and
    automatically downloading a preview of media related to said target media;
    wherein said automatically downloading is performed only during a given time period.

10. The method of claim 1, wherein said downloading the target media the first time comprises:
    automatically selecting the higher encoding rate; and
    responsive to the previous act of downloading said target media at the encoding rate less than said higher encoding rate, downloading again said target media at said higher encoding rate, said downloading the target media the first time being performed only during a given time period.

11. The method of claim 1, wherein said downloading the enhanced version of the target media comprises:
    downloading said target media; and
    downloading additional content associated with said target media, said downloading being performed only during the time period.

12. The method of claim 11, wherein said additional content comprises at least one of:
    album art associated with said target media;
    lyric text associated with said target media; or
    a music video associated with said target media.

13. The method of claim 1, wherein the target media downloaded the first time corresponds to a version of the target media that is optimized for the estimated bandwidth of said network when the estimated bandwidth of said network is not greater than the threshold.

14. The method of claim 1, wherein the enhanced version of the target media corresponds to a version of the target media that is optimized for the estimated bandwidth of said network when the estimated bandwidth of said network is greater than the threshold.

15. A wireless device, comprising:
    a bus;
    a radio transceiver, coupled to said bus, for interfacing said wireless device with a wireless network;
    a user interface, coupled to said bus;
    a memory, coupled to said bus, said memory storing a media player and at least one bandwidth air link maximizer for controlling a download of a target media for said media player; and
    an application-specific integrated circuit (ASIC), coupled to said bus, said ASIC configured to control said radio transceiver, user interface, and memory;
    wherein said at least one bandwidth air link maximizer is configured to:
        estimate a bandwidth of said wireless network;
        determine that the estimated bandwidth of said wireless network is not greater than a threshold;
        download, based on the determination of the estimated bandwidth being not greater than the threshold, the target media a first time;
        later estimate, after the download of the target media the first time, the bandwidth of said wireless network;
        determine that the later estimated bandwidth of said wireless network is greater than the threshold; and
        download, based on the determination of the later estimated bandwidth being greater than the threshold, an enhanced version of the target media, wherein downloading the enhanced version of the target media comprises:
            automatically selecting a higher encoding rate; and
            responsive to a previous act of downloading said target media at an encoding rate less than said higher encoding rate, downloading again said target media at said higher encoding rate only during a time period.

16. The wireless device of claim 15, wherein said download of the enhanced version of the target media comprises:
  downloading said target media; and
  automatically downloading a preview of media related to said target media.

17. The wireless device of claim 15, wherein said download of the enhanced version of the target media comprises:
  downloading said target media; and
  downloading additional content associated with said target media.

18. The wireless device of claim 17, wherein said additional content comprises at least one of:
  album art associated with said target media;
  lyric text associated with said target media;
  a music video associated with said target media; or
  any combination thereof.

19. The wireless device of claim 15, wherein said memory stores a low bandwidth air link maximizer for operating a media download service to download the target media the first time when the estimated bandwidth does not exceed the threshold and a high bandwidth air link maximizer for operating said media download service to download the enhanced version of the target media when the estimated bandwidth exceeds the threshold.

20. The wireless device of claim 15, wherein said download of the target media the first time comprises:
  downloading said target media; and
  automatically downloading a preview of media related to said target media;
  wherein said automatically downloading is performed only during a given time period.

21. The wireless device of claim 15, wherein said download of the target media the first time comprises:
  automatically selecting the higher encoding rate; and
  responsive to a previous downloading of said target media at the encoding rate less than said higher encoding rate, downloading again said target media at said higher encoding rate, said downloading again being performed only during a given time period.

22. The wireless device of claim 15, wherein said download of the target media the first time comprises:
  downloading said target media; and
  downloading additional content associated with said target media, said downloading of the target media the first time being performed only during a given time period.

23. The wireless device of claim 22, wherein said additional content comprises at least one of:
  album art associated with said target media;
  lyric text associated with said target media;
  a music video associated with said target media; or
  any combination thereof.

24. A wireless device, comprising:
  a bus means;
  a radio transceiver means, coupled to said bus means, for interfacing said wireless device with a wireless network;
  a user interface means, coupled to said bus means;
  a memory means, coupled to said bus means, said memory means storing a media player and at least one bandwidth air link maximizer means for controlling a download of a target media for said media player; and
  an application-specific integrated circuit (ASIC) means, coupled to said bus means, said ASIC means configured to control said radio transceiver means, user interface means, and memory means;
  wherein said at least one bandwidth air link maximizer means is configured to:
    estimate a bandwidth of said wireless network;
    determine that the estimated bandwidth of said wireless network is not greater than a threshold;
    download, based on the determination of the estimated bandwidth being not greater than the threshold, the target media a first time;
    later estimate, after the download of the target media the first time, the bandwidth of said wireless network;
    determine that the later estimated bandwidth of said wireless network is greater than the threshold; and
    download, based on the determination of the later estimated bandwidth being greater than the threshold, an enhanced version of the target media, wherein downloading the enhanced version of the target media comprises:
      automatically selecting a higher encoding rate; and
      responsive to a previous act of downloading said target media at an encoding rate less than said higher encoding rate, downloading again said target media at said higher encoding rate only during a time period.

25. The wireless device of claim 24, wherein said memory means stores a low bandwidth air link maximizer means for operating a media download service to download the target media the first time when the estimated bandwidth does not exceed the threshold and a high bandwidth air link maximize means for operating said media download service to download the enhanced version of the target media when the estimated bandwidth exceeds the threshold.

26. A non-transitory computer readable storage medium including instructions stored thereon comprising:
  instructions to estimate a bandwidth of a wireless network;
  instructions to determine that the estimated bandwidth of said wireless network is not greater than a threshold;
  instructions to download, based on the determination of the estimated bandwidth being not greater than the threshold, a target media a first time;
  instructions to later estimate, after the downloading of the target media the first time, the bandwidth of said wireless network;
  instructions to determine that the later estimated bandwidth of said wireless network is greater than the threshold; and
  instructions to download, based on the determination of the later estimated bandwidth being greater than the threshold, an enhanced version of the target media, wherein said instructions to download the enhanced version of the target media comprise:
    instructions to automatically select a higher encoding rate; and
    instructions to, responsive to a previous act of downloading said target media at an encoding rate less than said higher encoding rate, download again said target media at said higher encoding rate only during a time period.

27. The non-transitory computer readable storage medium of claim 26, further comprising:
  instructions to operate a media download service to download the target media the first time when said estimated bandwidth does not exceed the threshold; and
  instructions to operate said media download service to download the enhanced version of the target media when said estimated bandwidth exceeds the threshold.

* * * * *